United States Patent [19]
Gröblacher et al.

[11] Patent Number: 5,236,325
[45] Date of Patent: Aug. 17, 1993

[54] APPARATUS FOR PRODUCING AN EXTRUDED PROFILE WITH THRUST-RESISTANT SPACER

[75] Inventors: Hans Gröblacher; Ludwig Reisinger, both of McPherson, Kans.

[73] Assignee: Friedrich Theysohn GmbH, Langenhagen, Fed. Rep. of Germany

[21] Appl. No.: 795,898

[22] Filed: Nov. 18, 1991

[30] Foreign Application Priority Data

Nov. 16, 1990 [DE] Fed. Rep. of Germany ....... 4036577

[51] Int. Cl.⁵ .................. B29C 47/92; B29C 51/10
[52] U.S. Cl. ................... 425/149; 425/150; 425/326.1; 425/388; 425/392; 264/40.7; 264/560; 264/568
[58] Field of Search ............... 425/308, 384, 388, 404, 425/141, 145, 392, 326.1, 403, 403.1, 149, 150; 264/560, 288.4, 568, 40.5, 40.7

[56] References Cited

U.S. PATENT DOCUMENTS

| 2,747,224 | 5/1956 | Koch et al. | 425/376.1 |
|---|---|---|---|
| 3,583,620 | 6/1971 | Postins | 226/172 |
| 3,821,349 | 6/1974 | Mozer | 264/560 |
| 3,825,641 | 7/1974 | Barnett | 264/560 |
| 4,100,239 | 7/1978 | Daniels | 264/102 |
| 4,526,526 | 7/1985 | Krogh | 425/143 |
| 4,563,147 | 1/1986 | Langecker | 425/376.1 |
| 4,886,634 | 12/1989 | Strutzel et al. | 264/560 |

FOREIGN PATENT DOCUMENTS

| 0237723A2 | 1/1987 | European Pat. Off. . |
|---|---|---|
| 0452814A1 | 10/1991 | European Pat. Off. . |
| 1059846 | 11/1955 | France . |
| 2359696 | 2/1978 | France . |
| 57-36628 | 2/1982 | Japan ............ 425/326.1 |
| 62-60632 | 3/1987 | Japan ............ 425/326.1 |

OTHER PUBLICATIONS

Patent Abstracts of Japan, Appl. No. 57-213318; 59-103735 (A) UBE Kosan K.K.; "Formation of Extruded Piece of Thermoplastic Resin".

Primary Examiner—Khanh P. Nguyen
Attorney, Agent, or Firm—Herbert Dubno

[57] ABSTRACT

A compression-resistant spacer is provided between the lower track of a hauler and the calibrator mounting platform of a calibrator or sizer in a extrusion line to prevent vibration of the calibrator and minimize wall thickness variations and surface markings of extruded profiles such as window profiles.

17 Claims, 3 Drawing Sheets

APPARATUS FOR PRODUCING AN EXTRUDED PROFILE WITH THRUST-RESISTANT SPACER

FIELD OF THE INVENTION

Our present invention relates to an apparatus for producing an extruded profile and, more particularly, to an apparatus of the type in which a plastifier or extruder generates an extruded body which, to prevent collapse, passes to a vacuum table or a calibrator in which the body is sized and cooled and solidified, before that body is engaged by a hauler, haul-off or take-off device for drawing that body through the calibrator and the cooling apparatus.

The invention, more specifically, relates to the interconnection of the calibrator table and the hauler.

BACKGROUND OF THE INVENTION

In the production of extruded bodies, generally hollow or shaped bodies such as window or frame members, tubes or the like, hereinafter referred to variously as an extrudate, an extruded body, an extruded profile or an extruded shape, the extrusion with pliable and plastically deformable walls emerges from an extrusion die of a plastifying device or extruder and can be passed to a calibrating table.

The calibrating table may comprise a base, housing or machine structure upon which a support or mounting platform is vertically displaceable for alignment with the extruder and can carry sizing or calibrating members, generally operated under vacuum or suction to draw walls of the extrusion against the calibrating or sizing surfaces and thereby prevent collapse of the extrusion during the cooling and solidifying stage. The calibrator imparts nuances of size and shape to the extrusions and the solidified body which emerges has sufficient cohesion, tensile strength and compressive strength to enable the resulting extruded body to be handled.

To draw the extrusion or extruded body through the calibrator, a track-type hauler may be provided downstream of the calibrating table. The hauler may have a pair of tracks or caterpillars, each of which extends longitudinally in the longitudinal direction of the extruded profile and comprises a pair of endless tracks mounted on sprockets which are spaced apart in the direction in which the profile is drawn. The chains forming the tracks carry pads which grip the profile between them and advance the profile through a gap between the tracks.

In such systems, the calibrator table and the hauler can be fixed on respective bases. It has been found, however, that the pulling force of the hauler, when applied indirectly to the calibrating devices on the calibrating frame, may cause fluctuating movements of that frame in the hauling direction. Accordingly, variations in the extruded body can result which may be detrimental or at least can cause problems where substantial uniformity is necessary, e.g. in the case of window-forming profiles.

In spite of the presence of the calibrator in such cases, moreover, the wall thickness of the product may vary.

In addition, it is difficult with prior art systems of the aforedescribed type, to gain precise information with respect to the force with which the hauler acts upon the extruded body.

In the drawing of the profile body by the hauler, therefore, forces are applied to the calibrator and cooler support frame which vibrates during the process as these forces are applied to the devices provided for vertically adjusting the frame. The vibration is detrimental to the quality of the profiled body which is produced and the precision with which the product is formed. It also may detrimentally affect surface quality of the profile body. One of the characteristics of these earlier systems is that unacceptable marking of the surface can occur as a result of these vibrations.

The so-marked and so-affected extrusions must be discarded.

OBJECTS OF THE INVENTION

It is, therefore, the principal object of the present invention to provide an improved apparatus for the production of such extruded bodies whereby these drawbacks are avoided.

Another object of this invention is to provide an apparatus for the production of high quality extrusions which substantially completely prevents vibration of the calibrator element with respect to the hauler so that defects of the type described cannot arise in the extruded product.

SUMMARY OF THE INVENTION

These objects and others which will become apparent hereinafter are attained, in accordance with the invention, in an apparatus of the type described but wherein a compression-resistant spacer is interposed directly between the calibrator support or mounting platform and the tracks of the hauler.

Since the spacer is connected at one end to the mounting platform which holds the calibrating element and, at its opposite end, to the hauler, relative movements of the frame and the hauler cannot be generated, notwithstanding the tractive force applied to the extruded body by the tracks and the forces frictionally transferred by the calibrator elements to the calibrator mounting platform because of the sliding engagement of the walls of the extrusion with the calibrator and cooling elements.

More particularly, an apparatus for producing an extruded profile according to the invention can comprise:
  plastifying means for extruding a continuous shaped elongated body in a direction of extrusion;
  a calibrating table downstream of the plastifying means in the direction and including:
    a calibrating table base,
    a generally horizontal support platform on the base, .
    adjustment means between the base and the platform for vertically shifting the platform for alignment of the calibrating table with the plastifying means,
    at least one vacuum calibrator on the platform receiving the body from the plastifying means for sizing the body, and
    cooling means on the platform for cooling the body to impart rigidity thereto;
  a hauler downstream of the calibrating table, receiving the body therefrom and provided with track means gripping the body and drawing the body in this direction; and
  an elongated thrust-resistant spacer disposed directly between the platform and the hauler for maintaining a predetermined relative spacing of the track means and the platform as the hauler pulls the body through the calibrator and the cooling means.

According to a feature of the invention, respective pivotal articulations connect the elongated thrust-resistant spacer to the platform and the hauler at opposite ends of the spacer. Means can be provided for adjusting an axial length of the spacer and this means can include a thread connection between, for example, an externally threaded rod and an internally threaded portion of a tube receiving that rod and forming the spacer therewith. One of the rod and the tube, preferably the rod, can be rotated.

The means for rotating the rod can include, according to the invention, a worm and worm-wheel arrangement, preferably driven through a transmission comprising a pair of wheels connected by an endless element and driven in turn by an electric motor.

The compression-resistant connection between the calibrator mounting platform, which is vertically adjustable on the calibrator base, and the hauler, while traction is applied via the hauler to the extruded body, ensures a substantially rigid connection between the platform and the hauler. Forces transmitted to the calibrator, therefore, are fully taken up by the spacer and not by the means for vertically adjusting the calibrator mounting platform and which, in the past, were susceptible to vibration and movement. Vibration is no longer imparted to the platform or the calibrating elements and thus the profile bodies which are produced are of uniform quality and surface finish.

According to another feature of the invention, means is provided for measuring the pulling force generated by the hauler along the spacer.

By tying the hauler to the support platform of the vacuum table in accordance with the invention, and especially by mounting the spacer between the lower haul-off track and the calibrator mounting platform, the actual forces generated between the hauler and the calibrator are transferred precisely where these forces are generated. Thus the spacer provides an ideal element for signalling the pulling force which is actually applied. To this end, a load cell is provided along the spacer and produces a output signalling the actual pulling force which is generated. The load cell can provide information enabling adaptation of the process from one sizer to the next, can provide information of interest with respect to sizer wear and can signal when parts require replacement or adjustment. It allows the operator also to study variations in bulk density occurring upstream or at the extruder.

BRIEF DESCRIPTION OF THE DRAWING

The above and other objects, features and advantages of the present invention will become more readily apparent from the following description, reference being made to the accompanying drawing in which.

DESCRIPTION

Figure 1:
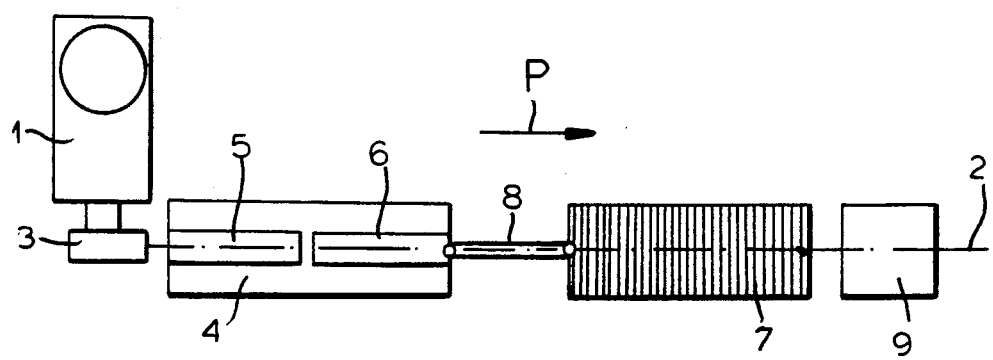
FIG. 1 is a diagrammatic plan view of an apparatus for producing an extruded profile according to the invention, for example, hollow window profiles.
Figure 2:
FIG. 2 is a cross sectional view through a profile as made by the apparatus of FIG. 1.

Referring to FIGS. 1—4, it can be seen that an extruder 1, for extruding, for example a window profile 2 as shown in FIG. 2 from a thermoplastic synthetic resin, especially a hollow profile but also a solid-cross section member, can comprise an extrusion head 3 of extruder 1 forming a plastifying unit.

Figure 3:
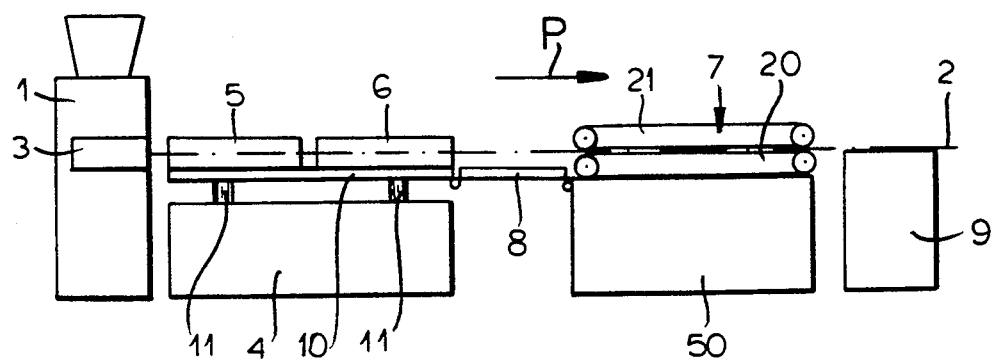
FIG. 3 is a side elevational view of the apparatus of FIG. 1, also in highly diagrammatic form.

The extrusion 2 is fed along the line shown in dot-dash lines in FIGS. 1 and 3 to a calibrator or sizer 5 on a calibrating table 4. The calibrator 5 has a throughgoing opening which is matched to the profile of the body 2. During the production process, the calibrator is placed under suction so that the walls of the body 2 are sucked against the inner wall of the calibrator 5 and thus so that the extrusion cannot collapse.

As the extrusion is drawn in the direction of the arrow P, the body 2 passes into a cooling unit 6 which is also mounted on the calibrating table 4.

The cooled and thus stable body 2 is engaged by a hauler or haul-off device 7 of the track type so that it is continuously drawn between the tracks 20 and 21 thereof in the direction of arrow P. The base of the hauler 7 is represented at 50 in FIG. 3.

Between the calibrating table 4 and the hauler 7, a compression-resistant spacer 8 is provided which prevents vibration of the calibrating table as has been described above.

More particularly, the calibrating table comprises a support or mounting system 10 which can be a platform upon which the calibrator or sizer 5 and the cooling unit 6 can be mounted and which can be adjusted as to its height by means represented at 11, for example, screw or hydraulic jacks, two of which are visible in FIG. 3, on the base of the calibrator. The platform 10 can also be adjusted so that it can be tilted to its longitudinal direction for alignment of the sizer 5 with the extruder and the alignment of the calibrating table with the hauler 7.

Although one sizer 5 has been illustrated and we have also shown only one cooling device 6 which can be supplied with cooling water, it has been found to be advantageous, because the throughgoing opening of the sizer 5 must be machined with high accuracy, to subdivide the sizer into a plurality of successive elements. The length of the calibrating table 4 and hence the length of the calibrator mounting platform 10 can be in practice between 4 and 8 m. In practice, moreover, the calibrating mounting platform 10 can have eight sizing units and the sizing unit 5 and cooling devices 6 can be combined with one another, for example, by circulating cooling water through the sizers.

Figure 4:
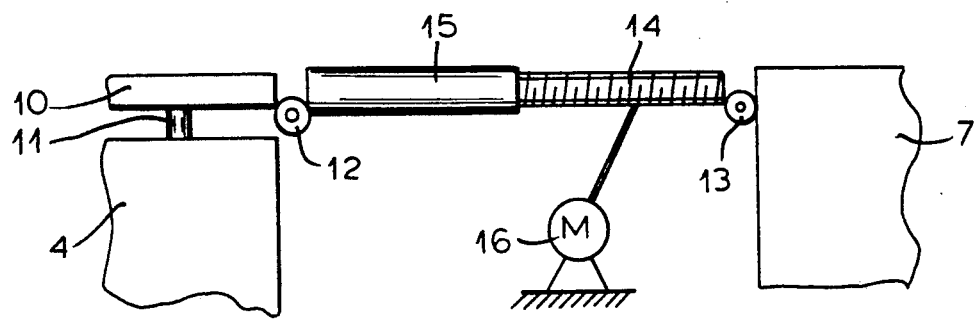
FIG. 4 is a detail view of the spacer of FIGS. 1 and 3.
Figure 5:
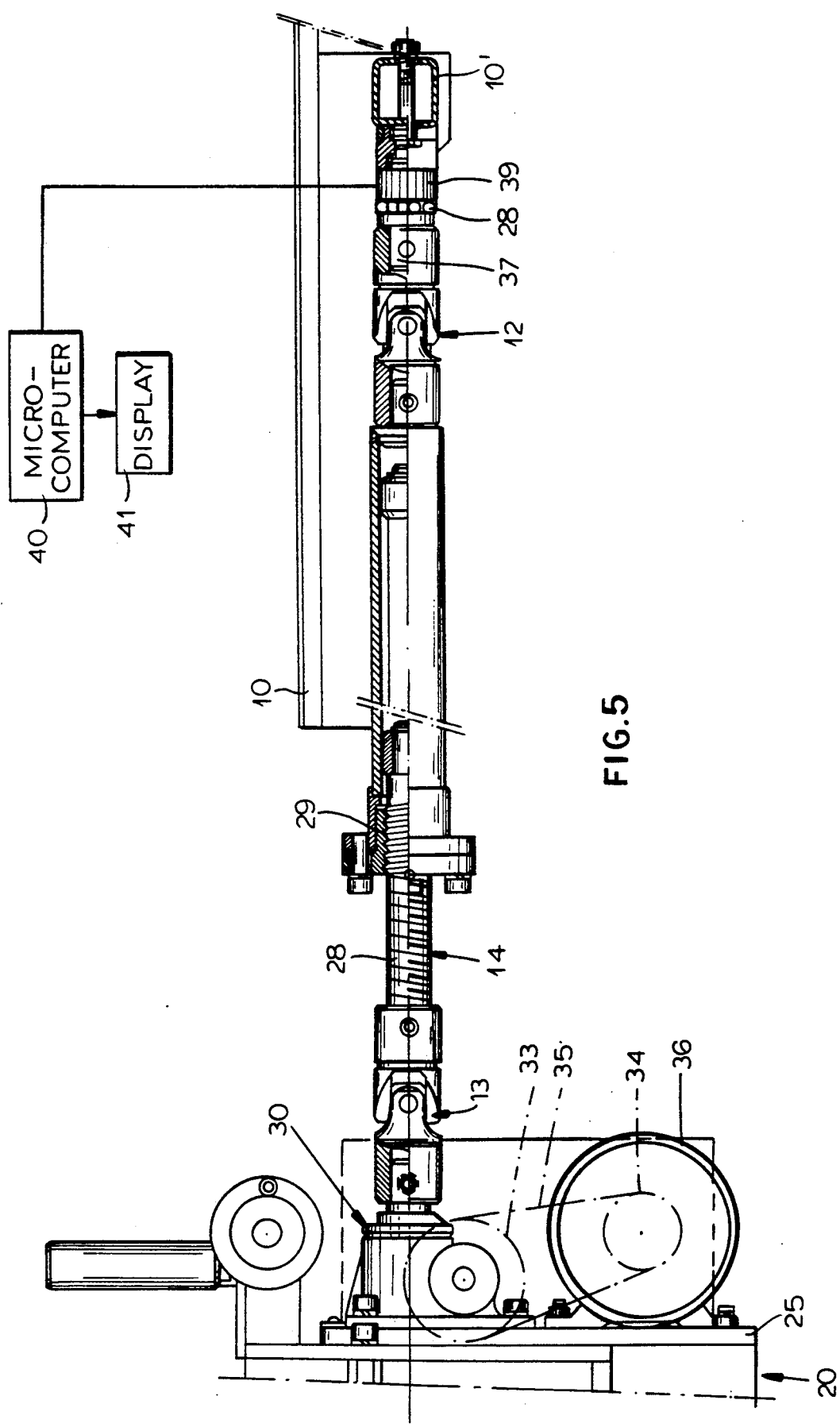
FIG. 5 is a cross sectional view through another spacer according to the invention showing in greater detail the means for axially adjusting the telescopingly-connected parts of the spacer.
Figure 6:
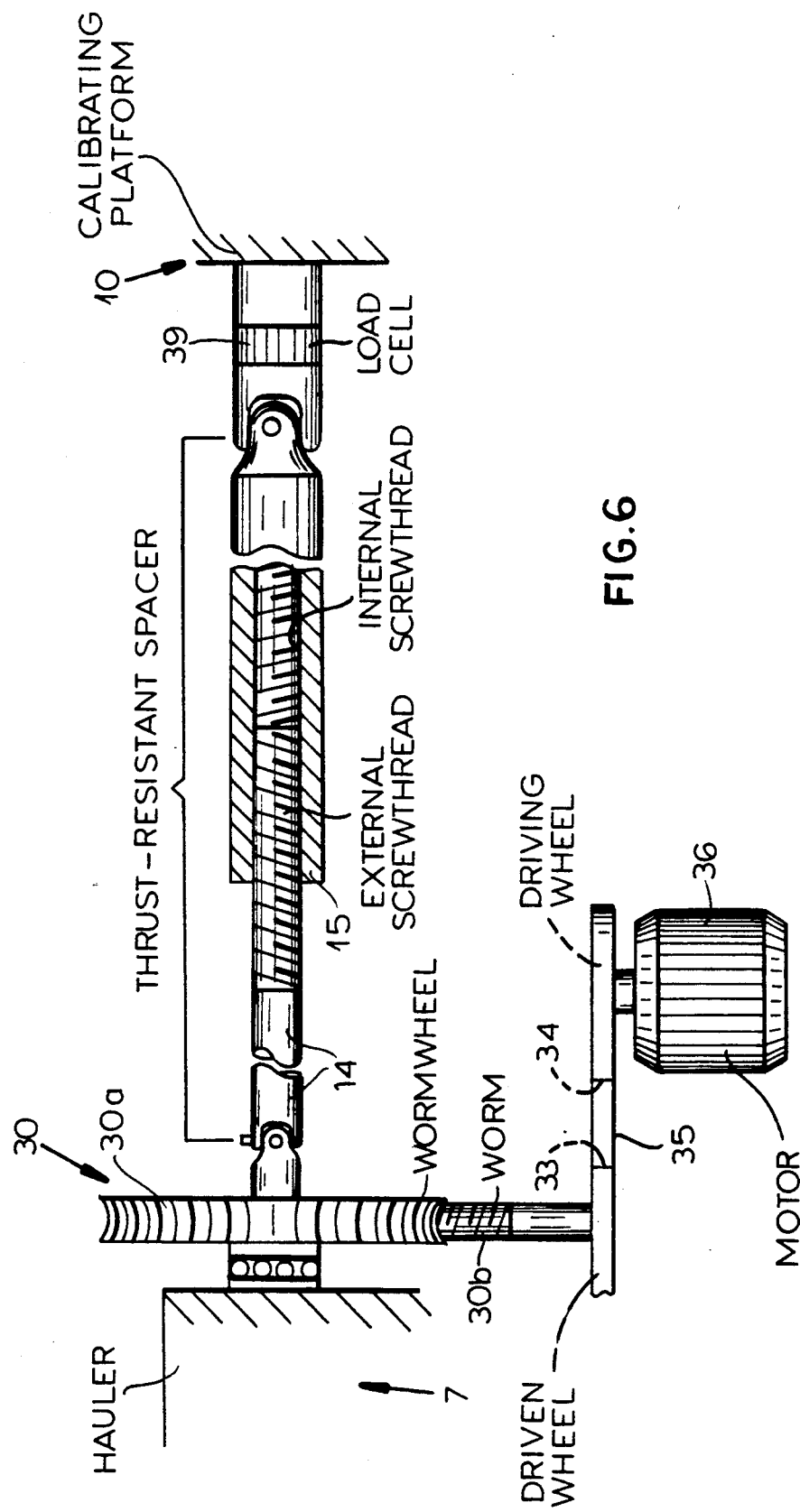
FIG. 6 is a diagram partly in cross section and partly in elevation, illustrating the subject matter shown in greater structural detail in FIG. 5 with respect to the thrust-resistant spacer, the motor for driving the spacer and the cooperation therewith with the hauler and the platform of thew calibrator.

So that the force transmission is directly between platform 10 and the force-generating means of the hauler, the spacer 8 is braced between the platform 10 and the lower track 20 of the hauler 7 (see also FIG. 5 in which a plate 25 of the lower track is visible). The spacer 8 should be substantially horizontal and parallel to the body 2. So that adjustment of the platform 10 is not impeded, the spacer 8, as clearly shown in FIGS. 4 and 5, is connected by pivots to the platform 10 and the hauler 17, the pivots being indicated at 12 and 13, respectively.

The profile body 2 is drawn during the production process in the direction of arrow P by the hauler 7 and can be cut into lengths at 9, e.g. by a saw. Within the sizer or sizers 5, the walls of the body 2 are drawn against the inner walls of the sizer or sizers by the suction applied and slide against these walls while adhering somewhat thereto. The resulting friction force must be exceeded by the tractive force generated by the hauler 7. The same force is applied to the calibrator 5 and is taken up by the spacer 8. The vertical adjusters 11, therefore, are not loaded by these forces.

The spacer 8 can be axially adjustable and can, for this purpose, include a threaded rod 14 which is threaded into an internally threaded tube 15. The adjustability of the length of the spacer by the motor 16 (FIG. 4) or in some other way, is advantageous, especially when the table 4 can be shiftable between the extruder 1 and the hauler 7. This can be the case when such mobility is advantageous for cleaning of the opening in the extrusion head 3 or access thereto is required for other means. In practice the sizer 5 is provided in such close proximity to the extrusion head 3 that access is frequently blocked. The adjustment can, therefore, also be used for actually shifting the calibrating table if desired.

Referring now to FIG. 5, it can be seen that the hauler 7 can comprise the support plate 25 previously mentioned. The tracks 20 and 21 can be mounted on sprockets about which the respective tracks pass and carry pads engageable with the profile 2. Details of constructions of the tracks and the pads may be found in the concurrently-filed commonly-owned copending applications Ser. Nos. 07/795,904, and 07/795,903 both filed on Nov. 18, 1991.

The plate 25 of the lower track 20 can be provided with a swivel joint 13 providing the pivotal connection to the externally threaded rod 14. The external screw thread of the latter is represented at 28 and engages the internal screw thread 29 of the tube 15. The latter is connected via a universal joint forming the pivot 12 to the bracket 10' of the platform 10. The stem 37 of this universal joint bears via a thrust bearing 28, shown only diagrammatically, upon a load cell 39 braced against the bracket 10'. The output of the load cell 39 can be applied through a microcomputer 40 to a display 41 or to a memory or other processing equipment.

The load cell 39 allows the drawing forces applied by the hauler 7 to be monitored with a high degree of precision and the thresholds exceeded or understepped by that haul-off force can signal an operator for appropriate reaction.

The rod 14 can be rotated by a worm/wormwheel transmission 30 (having a worm 30b meshing with a wormwheel 30a) connected by the universal joint 13 to the rod 14 and, in turn, connected to a driven wheel 33 coupled by an endless member 35 such as a chain, cog belt or the like with a drive wheel 34 is connected to the electric motor 36.

We claim:

1. An apparatus for producing an extruded profile, comprising:
    plastifying means for extruding a continuous shaped elongated body in a direction of extrusion;
    a calibrating table downstream of said plastifying means in said direction and including:
        a calibrating table base,
        a generally horizontal mounting platform on said base,
        adjustment means between said base and said platform for vertically shifting said platform for alignment of the calibrating table with said plastifying means,
        at least one vacuum calibrator on said platform receiving said body from said plastifying means for sizing said body, and
        cooling means on said platform for cooling said body to impart rigidity thereto;
    a hauler downstream of said calibrating table, receiving said body therefrom and provided with track means gripping said body and drawing said body in said direction;
    an elongated thrust-resistant spacer between said platform and said hauler for maintaining a predetermined relative spacing of said track means and said platform as said hauler pulls said body through said calibrator and said cooling means; and respective pivotal articulations connecting said elongated thrust-resistant spacer to said platform and said hauler at opposite ends of said spacer.

2. The apparatus defined in claim 1, further comprising means for adjusting an axial length of said elongated thrust-resistant spacer.

3. The apparatus defined in claim 2 wherein said spacer comprises an internally threaded tube receiving an externally threaded rod, said means for adjusting the axial length of said elongated thrust-resistant spacer including means for rotating one of the rod and tube.

4. The apparatus defined in claim 3 wherein said elongated thrust-resistant spacer extends substantially horizontally between said platform and said track means.

5. The apparatus defined in claim 4 wherein said means for rotating includes an electric motor.

6. The apparatus defined in claim 5, further comprising a gearing having a worm meshing with a wormwheel, said gearing operatively connected to said one of said rod and said tube and driven by said motor.

7. The apparatus defined in claim 6, further comprising a transmission comprising a pair of spaced apart wheels and an endless element connecting said wheels interposed between said gearing and said motor.

8. The apparatus defined in claim 7 wherein the rod is rotated by said gearing and said motor.

9. The apparatus defined in claim 8, further comprising a force-measuring cell along said spacer for measuring traction applied to said body by said hauler.

10. The apparatus defined in claim 9 wherein said force-measuring cell is disposed between said spacer and said platform.

11. An apparatus for producing an extruded profile, comprising:
    plastifying means for extruding a continuous shaped elongated body in a direction of extrusion;
    a calibrating table downstream of said plastifying means in said direction and including:
        a calibrating table base,
        a generally horizontal mounting platform on said base,
        adjustment means between said base and said platform for vertically shifting said platform for alignment of the calibrating table with said plastifying means, at least one vacuum calibrator on said platform receiving said body from said plastifying means for sizing said body, and cooling means on said platform for cooling said body to impart rigidity thereto;

a hauler downstream of said calibrating table, receiving said body therefrom and provided with track means gripping said body and drawing said body in said direction;

an elongated thrust-resistant spacer between said platform and said hauler for maintaining a predetermined relative spacing of said track means and said platform as said hauler pulls said body through said calibrator and said cooling means; and means for adjusting an axial length of said elongated thrust-resistant spacer, said spacer extending generally horizontally between said track means and said spacer.

12. The apparatus defined in claim 11 wherein said spacer comprises an internally threaded tube receiving an externally threaded rod, said means for adjusting the axial length of said elongated thrust-resistant spacer including means for rotating said rod.

13. The apparatus defined in claim 12 wherein said means for rotating includes an electric motor.

14. The apparatus defined in claim 13, further comprising a gearing having a worm meshing with a wormwheel, said gearing operatively connected to said one of said rod and said tube and drive by said motor.

15. The apparatus defined in claim 14, further comprising a transmission comprising a pair of spaced apart wheels and an endless element connecting said wheels interposed between said gearing and said motor.

16. An apparatus for producing an extruded profile, comprising:

plastifying means for extruding a continuous shaped elongated body in a direction of extrusion;

a calibrating table downstream of said plastifying means in said direction and including:

a calibrating table base, a generally horizontal mounting platform on said base, adjustment means between said base and said platform for vertically shifting said platform for alignment of the calibrating table with said plastifying means, at least one vacuum calibrator on said platform receiving said body from said plastifying means for sizing said body, and cooling means on said platform for cooling said body to impart rigidity thereto;

a hauler downstream of said calibrating table, receiving said body therefrom and provided with track means gripping said body and drawing said body in said direction;

an elongated thrust-resistant spacer between said platform and said hauler for maintaining a predetermined relative spacing of said track means and said platform as said hauler pulls said body through said calibrator and said cooling means; and a force-measuring cell along said spacer for measuring traction applied to said body by said hauler.

17. The apparatus defined in claim 16 wherein said force-measuring cell is disposed between said spacer and said platform.

* * * * *